United States Patent
Watabe

(10) Patent No.: US 7,512,467 B2
(45) Date of Patent: Mar. 31, 2009

(54) TIRE AIR PRESSURE SURVEILLANCE SYSTEM

(75) Inventor: Nobuya Watabe, Nagoya (JP)

(73) Assignee: Denso Corporation, Kariya (JP)

( * ) Notice: Subject to any disclaimer, the term of this patent is extended or adjusted under 35 U.S.C. 154(b) by 722 days.

(21) Appl. No.: 10/936,485

(22) Filed: Sep. 9, 2004

(65) Prior Publication Data
US 2005/0065681 A1    Mar. 24, 2005

(30) Foreign Application Priority Data
Sep. 18, 2003 (JP) ............... 2003-326620
Aug. 5, 2004 (JP) ............... 2004-229658

(51) Int. Cl.
*G01M 17/00* (2006.01)
*G06F 7/00* (2006.01)
*G06F 19/00* (2006.01)

(52) U.S. Cl. .................. 701/29; 307/9.1; 307/10.1; 73/146

(58) Field of Classification Search ............... None
See application file for complete search history.

(56) References Cited

U.S. PATENT DOCUMENTS

| | | | | |
|---|---|---|---|---|
| 5,179,981 A | * | 1/1993 | Hicks et al. | 141/4 |
| 5,557,552 A | * | 9/1996 | Naito et al. | 702/148 |
| 5,561,415 A | * | 10/1996 | Dieckmann | 340/444 |
| 5,569,848 A | * | 10/1996 | Sharp | 73/146.2 |
| 5,721,528 A | * | 2/1998 | Boesch et al. | 340/442 |
| 5,866,812 A | * | 2/1999 | Nishihara et al. | 73/146.2 |
| 5,929,756 A | * | 7/1999 | Randazzo et al. | 340/444 |
| 6,002,327 A | * | 12/1999 | Boesch et al. | 340/442 |
| 6,014,599 A | * | 1/2000 | Inoue et al. | 701/29 |
| 6,313,742 B1 | * | 11/2001 | Larson | 340/442 |
| 6,385,511 B1 | * | 5/2002 | Fondeur et al. | 701/1 |

(Continued)

FOREIGN PATENT DOCUMENTS

CN    1388018 A    1/2003

(Continued)

OTHER PUBLICATIONS

First Office Action from Chinese Patent Office issued on Jun. 23, 2006 for the corresponding Chinese patent application No. 200410078774.2 (English translation thereof).

*Primary Examiner*—Khoi Tran
*Assistant Examiner*—Nicholas Kiswanto
(74) *Attorney, Agent, or Firm*—Posz Law Group, PLC

(57) ABSTRACT

A tire air pressure surveillance system is provided with plural air pressure detecting devices disposed in plural tires respectively for detecting air pressure therein and for sending detected results by radio, a receiving device for receiving the detected results from the air pressure detecting devices by radio, and a monitor device for monitoring air pressure in the tires based on the detected results received by the receiving device. The air pressure detecting devices send sensor ID along with the detected results for distinguishing each air pressure detecting device. The sensor ID beforehand memorized in EEPRROM of the monitor device as determination sensor ID is broadcast-sent to the receiving device through a local area network at a predetermined interval. Only the detected results along with the sensor ID corresponding to the determination sensor ID are sent to the monitor device by the receiving device.

11 Claims, 6 Drawing Sheets

U.S. PATENT DOCUMENTS

| | | | |
|---|---|---|---|
| 6,404,330 B1* | 6/2002 | Sugisawa | 340/444 |
| 6,426,694 B1* | 7/2002 | Larson | 340/441 |
| 6,529,807 B2* | 3/2003 | Sugisawa | 701/29 |
| 6,529,851 B1* | 3/2003 | Oshiro | 702/148 |
| 6,594,566 B1* | 7/2003 | Skoff | 701/36 |
| 6,681,164 B2* | 1/2004 | Bergerhoff et al. | 701/36 |
| 6,701,230 B2* | 3/2004 | Bergerhoff et al. | 701/29 |
| 6,725,136 B2* | 4/2004 | Lutz et al. | 701/29 |
| 6,774,779 B2* | 8/2004 | Lin | 340/447 |
| 6,954,687 B2* | 10/2005 | Taguchi et al. | 701/29 |
| 6,998,974 B2* | 2/2006 | Bergerhoff et al. | 340/444 |
| 7,039,508 B2* | 5/2006 | Lin et al. | 701/29 |
| 7,092,804 B2* | 8/2006 | McQuade et al. | 701/29 |
| 7,177,739 B2* | 2/2007 | Kuchler | 701/29 |
| 7,187,273 B2* | 3/2007 | Rieck et al. | 340/443 |
| 7,205,886 B2* | 4/2007 | Kin | 340/442 |
| 7,239,948 B2* | 7/2007 | Nimmo et al. | 701/36 |
| 7,248,953 B2* | 7/2007 | Ogawa | 701/29 |
| 2001/0020203 A1* | 9/2001 | Sugisawa | 701/29 |
| 2003/0093198 A1* | 5/2003 | Bergerhoff et al. | 701/29 |
| 2004/0044450 A1* | 3/2004 | Taguchi et al. | 701/29 |
| 2004/0055370 A1* | 3/2004 | Normann et al. | 73/146 |
| 2004/0143376 A1* | 7/2004 | Rosseau | 701/29 |
| 2004/0172179 A1* | 9/2004 | Miwa | 701/29 |
| 2004/0225423 A1* | 11/2004 | Carlson et al. | 701/36 |
| 2004/0236485 A1* | 11/2004 | Deniau et al. | 701/36 |
| 2004/0260436 A1* | 12/2004 | Kin | 701/29 |
| 2005/0071057 A1* | 3/2005 | Lin et al. | 701/29 |
| 2005/0102073 A1* | 5/2005 | Ingram | 701/29 |
| 2006/0015225 A1* | 1/2006 | McQuade et al. | 701/29 |
| 2006/0041344 A1* | 2/2006 | Ooba | 701/29 |
| 2007/0055411 A1* | 3/2007 | Nihei et al. | 701/1 |
| 2007/0156312 A1* | 7/2007 | Breed et al. | 701/29 |

FOREIGN PATENT DOCUMENTS

| | | |
|---|---|---|
| JP | A-8-244423 | 9/1996 |
| JP | A-2001-322411 | 11/2001 |

* cited by examiner

TIRE AIR PRESSURE SURVEILLANCE SYSTEM

CROSS REFERENCE TO RELATED APPLICATION

This application is based on Japanese Patent Applications No. 2003-326620 filed on Sep. 18, 2003 and No. 2004-229658 filed on Aug. 5, 2004, the disclosure of which is incorporated herein by reference.

FIELD OF THE INVENTION

The present invention relates to a tire air pressure surveillance system (monitor system) for monitoring air pressure in vehicle tires by using an air pressure detecting device which is disposed in each of the vehicle tires to detect the air pressure in each vehicle tire.

BACKGROUND OF THE INVENTION

A tire air pressure surveillance system is provided with air pressure detecting devices disposed in vehicle tires for detecting air pressure in the vehicle tires and for sending air pressure information, and a receiving device for receiving the air pressure information sent from the air pressure detecting devices. The tire air pressure surveillance system monitors air pressure in the vehicle tires based on the air pressure information received by the receiving device, so that the vehicle having air-injection type tires are traveling securely.

In the above-described tire air pressure surveillance system, it is necessary to distinguish whether or not the received air pressure information corresponds to the own vehicle, in order to prevent the air pressure state of the tires of the own vehicle from being mistakenly determined based on the air pressure information from air pressure detecting devices of tires of other vehicles. Moreover, in order to accurately determine the air pressure state in each tire of the own vehicle, it is necessary to distinguish the received air pressure information of each tire.

Therefore, distinguishing information is given to each of the air pressure detecting devices. The distinguishing information of the air pressure detecting devices of the tires of the own vehicle is beforehand registered in the receiving device. Furthermore, the air pressure detecting devices send the air pressure information along with the distinguishing information by radio. By comparing the received distinguishing information and the distinguishing information memorized beforehand in the receiving device, it is determined which tire the air pressure information corresponds to (for example, referring to JP-A-2001-322411).

However, the air pressure information from tires of the other vehicles approaching the own vehicle is also received by the receiving device of the every vehicle, and the comparison of the distinguishing information of the air pressure information between the own vehicle and the other vehicles is also performed by the receiving device. Therefore, a process load of the receiving device is increased when traffic is busy.

In order to decrease the process load of the receiving device, a monitor device can be provided to be separated from the receiving device, for monitoring air pressure based on the air pressure information received by the receiving device. That is, the monitor device monitors the air pressure instead of the receiving device, and thereby the process load of the receiving device is reduced. In this tire air pressure surveillance system, the distinguishing information is beforehand memorized as determination information in the receiving device, and only the air pressure information having the distinguishing information corresponding to the determination information is sent to the monitor device. Therefore, it is necessary to provide a memorizing device in the receiving device for memorizing the determination information beforehand, and thereby cost of the receiving device is increased. Moreover, when a tire is exchanged, it is necessary to memorize the distinguishing information (determination information) of the air pressure detecting device of the new tire, in each receiving device again when multiple receiving devices are provided in the vehicle.

SUMMARY OF THE INVENTION

In view of the above-described problems, it is an object of the present invention to provide a tire air pressure surveillance system in which cost of a receiving device is decreased and determination information is readily memorized.

According to the present invention, the tire air pressure surveillance system includes: a plurality of air pressure detecting devices disposed in a plurality of tires of the vehicle respectively, to detect an air pressure in each of the tires and to send by radio detected results of the air pressure detecting devices along with distinguishing information which is used to distinguish each of the air pressure detecting devices; a receiving device for receiving the detected results sent from the air pressure detecting devices; and a monitor device for monitoring the air pressure in each of the tires based on the detected results received by the receiving device. In the tire air pressure surveillance system, the monitor device includes a memorizing means for memorizing the distinguishing information of all the air pressure detecting devices as determination information, and a determination-information sending means for sending the determination information memorized in the memorizing means to the receiving device every a predetermined timing. Furthermore, the receiving device includes a received-information memorizing means for memorizing the determination information received from the monitor device as received determination information, and a detected-result sending means for sending the detected results along with the distinguishing information corresponding to the received determination information to the monitor device, among the detected results received from the air pressure detecting devices.

Because the memorizing means is provided to the monitor device for memorizing the determination information beforehand, it is unnecessary to provide another memorizing means in the receiving device. Therefore, the cost of the receiving device is decreased. Moreover, the determination information is memorized only in the monitor device, so that the process load for memorizing the determination information is reduced in the receiving device.

For example, the receiving device connects with the monitor device through a cable signal channel. Alternatively, the receiving device connects with the monitor device through a radio signal channel.

Preferably, when the receiving device is constructed with a plurality of receiving parts, the determination-information sending means broadcast-sends the determination information of all the air pressure detecting devices to all the receiving parts. In this case, the sending of the determination information from the monitor device to the plural receiving parts can be finished by one time and can be made simplified.

Preferably, the receiving device has a requiring-order sending means which sends a sending-requiring order for requiring the monitor device to send the determination information when the received determination information is determined to be changed, and the monitor device has a resending means which sends the determination information to the receiving device when the monitor device receives the sending-requiring order from the receiving device. Accordingly, it can effectively restrict the air pressure information of the own vehicle from being not sent to the monitor device when the received determination information is changed.

More preferably, the receiving device has an another detected-result sending means which sends all the detected results received from the air pressure detecting devices to the monitor device when the received determination information is determined to be changed. Therefore, the air pressure information of the own vehicle can be sent to the monitor device even when the received determination information is changed.

Alternatively, the detected results are received in the receiving device as detected data, and the monitor device further includes a control portion for periodically sending a data-requiring order to the receiving device to require a sending of the detected data. The receiving device further includes a control portion which gives a requiring information to the detected data received by the receiving device, and an error detecting means provided with an error flag which is set for indicating a change of the received determination information and is cleared for indicating no change of the received determination information. The requiring information is constructed with a first set value for indicating a requirement of a sending of the determination information from the monitor device, and a second set value for indicating no requirement of a sending of the determination information from the monitor device. In this case, the detected-result sending means sends the detected data to the monitor device together with the requiring information with the first set value, when the error flag is set and the data-requiring order is received. Alternatively, the detected-result sending means sends the detected data to the monitor device together with the requiring information with the second set value, when the error flag is cleared and the data-requiring order is received. For example, the first set value is 1 and the second set value is 0.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Preferred embodiments of the present invention will be described hereinafter with reference to the accompanying drawings.

First Embodiment

A first preferred embodiment of the present invention will be now described with reference to FIGS. 1-4.

Figure 1:
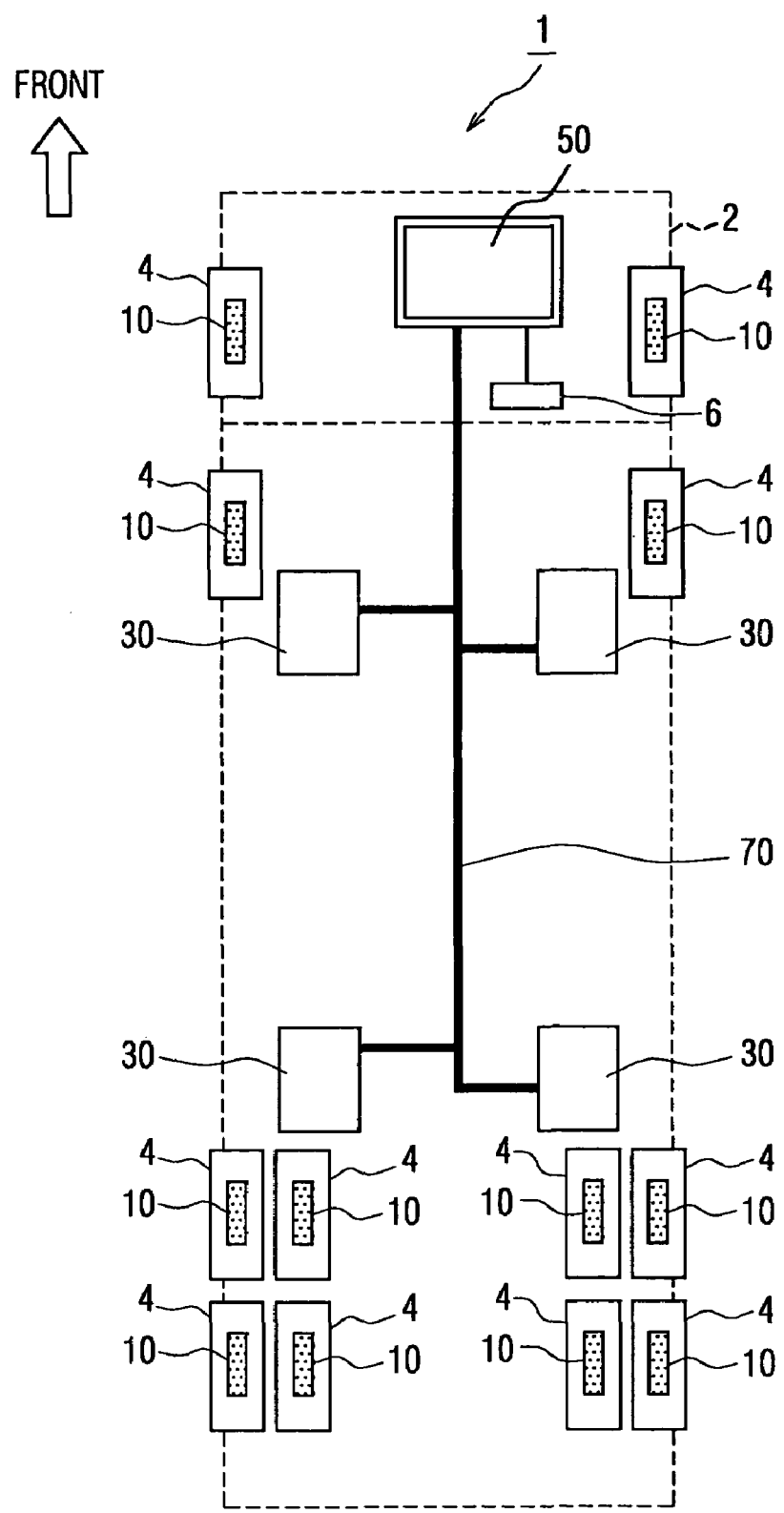
FIG. 1 is a schematic diagram showing a tire air pressure surveillance system which is typically used in a truck, according to a first preferred embodiment of the present invention.

At first, an arrangement of a tire air pressure surveillance system 1 (monitor system) is described referring to FIG. 1. In FIG. 1, the surveillance system 1 is typically used for a truck. The surveillance system 1 is provided with a plurality of air pressure detecting devices 10 for detecting air pressure in air-injected-type tubeless tires 4, receiving devices 30 for receiving detected results from the detecting devices 10, a monitor device 50 for monitoring air pressure in each of the tires 4 based on the detected results received by the receiving devices 30, and a local area network (LAN) 70 for connecting each of the receiving devices 30 with the monitor device 50.

Each of the detecting devices 10 is fixed to a rim (not shown) of each tire 4, together with a valve (not shown) for filling air in the tire 4. In this case, the tires 4, constructing wheels of a vehicle 2, are totaled 12. The detecting device 10 sends the detected results of air pressure in the tire 4 to the receiving devices 30 at a predetermined interval by radio.

The receiving devices 30 receive and demodulate radio wave with a predetermined frequency sent by the detecting devices 10, so that the detected results of the tires 4 are obtained. Thereafter, the receiving devices 30 send the detected results to the monitor device 50 by the LAN 70.

The monitor device 50 receives the detected results sent by the receiving devices 30, for monitoring air pressure state in the tires 4. When air pressure in one tire 4 deviates from a predetermined range, it is determined that the one tire 4 has an abnormality. In this case, an alarm is given by an informing device 6. The informing device 6 can be a sounding device such as a buzzer and a speaker, or can be an indicating device such as an alarm lamp and a liquid crystal display, or the like. The informing device 6 is disposed near a driver seat in order to inform the abnormality of the one tire 4 to an occupant.

Figure 2:
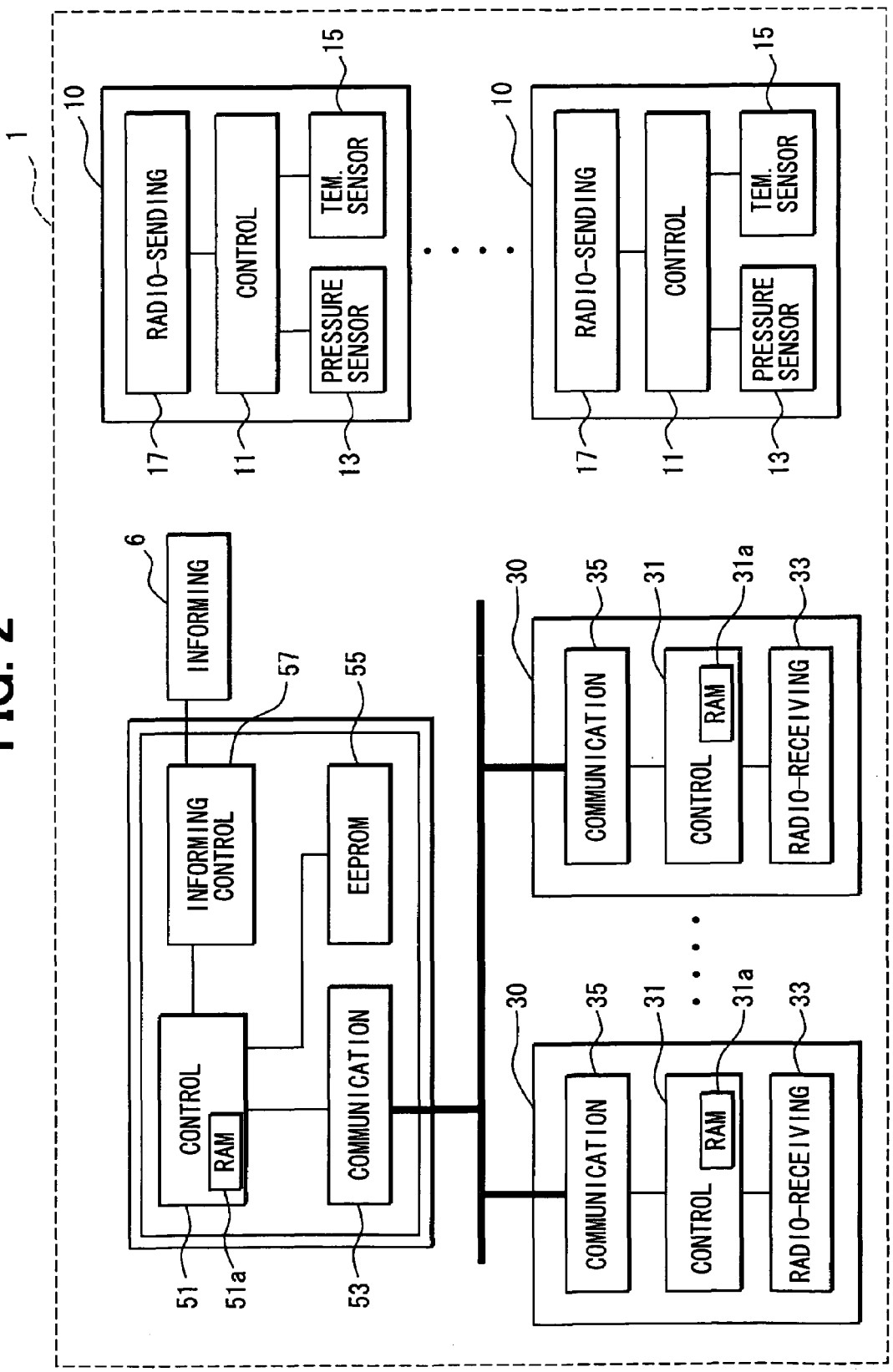
FIG. 2 is block diagram showing the tire air pressure surveillance system according to the first embodiment.

Next, an electrical configuration of the surveillance system 1 is described referring to FIG. 2.

The detecting device 10 is provided with a pressure sensor 13 for detecting air pressure in the tire 4, a temperature sensor 15 for detecting temperature in the tire 4, a radio-sending portion 17, and a control portion 11. According to detected signals of the pressure sensor 13 and the temperature sensor 15, the control portion 11 produces detected data of the air pressure and air temperature in the tire 4, and gives a distinguishing information (called sensor ID in following) of each detecting device 10 to the detected data which will be outputted to the radio-sending portion 17 of the detecting device. Thereafter, the radio-sending portion 17 modulates (for example, frequency modulation) the detected data into carrier wave, so that sending signals are produced and are sent to the receiving devices 30 by radio through a sending antenna (not shown).

The receiving device 30 is provided with a radio-receiving portion 33 for obtaining the detected data by demodulating the sending signals which are received from the radio-sending portion 17, a communication portion 35 for communicating the data between the receiving device 30 and the monitor device 50 through the LAN 70, and a control portion 31. The control portion 31 extracts (selects) the sensor ID which is given to the detected data inputted from the radio-receiving portion 33. Through the communication portion 35, the detected data of the detecting device 10 are sent to the monitor device 50 based on a determination of the sensor ID of the detected data, which will be described later.

Moreover, the control portion 31 of the receiving device 30 is provided with a RAM 31a for memorizing data. In the RAM 31a, determination sensor ID is memorized for distinguishing and determining which detecting device 10 the received detected data corresponds to. By comparing the sensor ID of the detected data with the determination sensor ID, it is determined whether or not the received detected data corresponds to the detecting devices 10 of own vehicle. A buffer can be provided in the RAM 31a for memorizing the detected data. In this embodiment, the determination sensor ID is determination information of the present invention.

The monitor device 50 is provided with a communication portion 53 for communicating data among the monitor device 50 and the receiving devices 30 through the LAN 70, an EEPROM 55 for memorizing data even if electric supply is stopped, an informing control portion 57 for controlling the informing device 6, and a control portion 51 for receiving the detected data from the receiving device 30 through the communication portion 53 and for monitoring the air pressure of the tires 4 based on the detected data. When air pressure in one tire 4 deviates from the predetermined range, the control portion 51 determines that the abnormality occurs in the one tire 4 and sends a signal to the informing control portion 57 to inform the abnormality. According to the signal, the informing control portion 57 controls the informing device 6. For example, when the informing device 6 is a display device (e.g., meter), the informing control portion 57 controls the display device.

In the EEPROM 55, the determination sensor ID is beforehand memorized for distinguishing all the detecting devices 10 in the surveillance system 1 of the own vehicle. Through the LAN 70, the monitor device 50 broadcast-sends all the determination sensor ID to the receiving devices 30.

Moreover, the control portion 51 is provided with a RAM 51a for memorizing data. The RAM 51a is provided with an ID-informing timer or counter C1 (not shown) for indicating a time period from a time point until an informing of the determination sensor ID by the control portion 51. Furthermore, a time value indicated by the ID-informing timer or counter C1 automatically decrements, for example, by 10 ms. When the time value of the ID-informing timer or counter C1 is set to a predetermined value at a time point, the ID-informing timer or counter C1 begins to decrement from the predetermined value at the time point. The time value of ID-informing timer or counter C1 is set at 0 immediately after a starting of the control portion 51 (i.e. immediately after turning ON).

Generally, a master-slave-type protocol, for example, LIN (Local Interconnect Network) is used as a communication protocol for sending and receiving information through the LAN 70.

In the control portion 51, an ID informing process for broadcast-sending the determination sensor ID is repeated when the electrical source of the control portion 51 is ON. The ID informing process of the control portion 51 will be described referring to FIG. 3A.

Figure 3A:
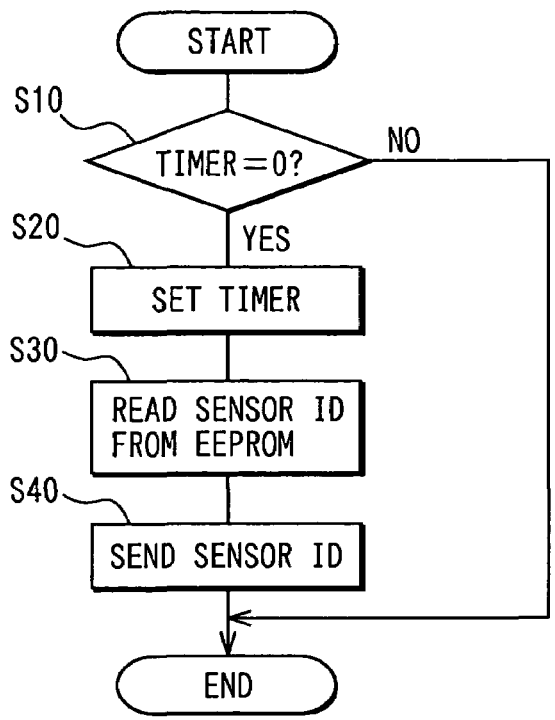
FIG. 3A is a flow diagram showing an ID informing process.

As shown in FIG. 3A, at step S10, the control portion 51 determines whether or not the time value of the ID-informing timer or counter C1 is equal to 0. When the time value is not equal to 0 (S10: NO), this ID informing process is finished. On the other hand, when the time value of the ID-informing timer or counter C1 is equal to 0 (S10: YES), the time value is set at the predetermined value (e.g., one hour) at step S20. At step S30, all the determination sensor ID is read out from EEPROM 55. At step S40, the determination sensor ID, which is read out, is broadcast-sent to the receiving device 30 through the LAN 70. Thereafter, this ID informing process shown in FIG. 3A is finished. That is, the determination sensor ID is broadcast-sent every the predetermined time, immediately after the control portion 51 is started.

Figure 3B:
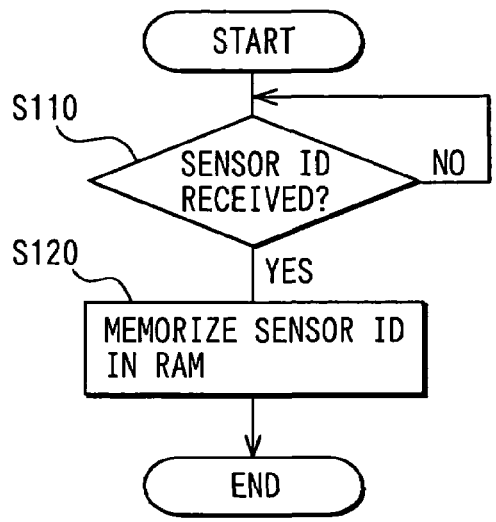
FIG. 3B is a flow diagram showing an ID receiving process.

Next, an ID receiving process is described referring to FIG. 3B. The ID receiving process is repeated by the control portion 31 to receive the determination sensor ID when the electrical source of the control portion 31 is ON.

As shown in FIG. 3B, at step S110, the communication portion 35 of the receiving portion 30 waits for a receiving of the determination sensor ID. When the control portion 31 determines that the determination sensor ID is received (S110: YES), the determination sensor ID is memorized in the RAM 31a at step S120, and this ID receiving process is finished. In contrast, when the control portion 31 determines that the determination sensor ID is not received (S110: NO) at step S110, step S110 is performed until the determination sensor ID is received.

Figure 3C:
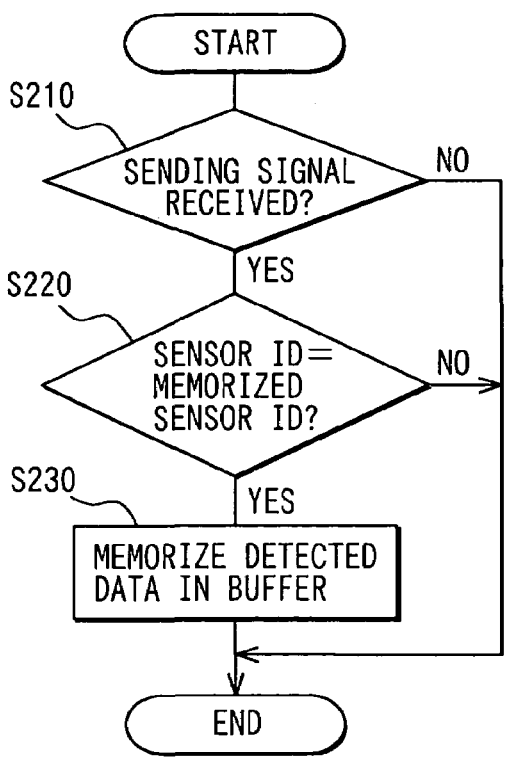
FIG. 3C is a flow diagram showing a detected-data receiving process and FIG. 3D is a flow diagram showing a detected-data sending process, according to the first embodiment.

Next, a detected-data receiving process is described referring to FIG. 3C. The detected-data receiving process is repeated by the control portion 31 to receive the detected data when the electrical source of the control portion 31 is turned ON.

As shown in FIG. 3C, at step S210, the control portion 31 determines whether or not the radio-receiving portion 33 receives the sending signals. When it is determined that the sending signals has been received (S210: YES), step S220 is performed.

At step S220, it is determined whether or not the sensor ID extracted from the detected data corresponds to the determination sensor ID which is memorized in RAM 31a. The detected data are obtained by demodulating the sending signals. When it is determined that the sensor ID corresponds to the determination sensor ID (S220: YES), the detected data are memorized in the buffer of the RAM 31a at step S230, and this detected-data receiving process is finished.

In contrast, when the control portion 31 determines that the sensor ID dose not correspond to the determination sensor ID (S220: NO), this detected-data receiving process is finished.

Moreover, when the control portion 31 determines that the sending signals are not received (S210: NO), this detected-data receiving process is finished.

Figure 3D:
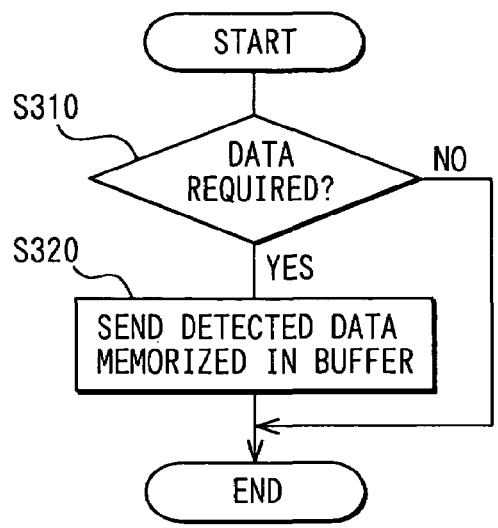

Next, a detected-data sending process is described referring to FIG. 3D. The detected-data sending process is repeated by the control portion 31 to send the detected data to the monitor device 50 when the electrical source of the control portion 31 is ON.

As shown in FIG. 3D, at step S310, the control portion 31 determines whether or not the communication portion 35 receives a data-requiring order from the monitor device 50. In this case, the control portion 51 periodically sends the data-requiring order to the receiving devices 30 at an interval that is sufficiently shorter than a time period for which the detecting devices 10 sends the detected data to the receiving devices 30.

When the control portion 31 determines that the communication portion 35 receives the data-requiring order from the monitor device 50 (S310: YES), the detected data, which is memorized in the buffer in RAM 31a, is sent to the monitor device 50 through the communication portion 35, at step S320.

On the other hand, when it is determined that the data-requiring order is not received (S310: NO), this detected-data sending process is finished.

In this embodiment, the EEPROM 55 is provided in the monitor device 50, for beforehand memorizing the determination sensor ID that will be sent to the receiving device 30 every the predetermined time immediately after the control portion 51 is started and thereafter. The receiving device 30 memorizes the determination sensor ID received from the monitor device 50, and thereafter sends the detected data along with the sensor ID corresponding to the determination sensor ID to the monitor device 50, among the detected data received from the detecting devices 10.

Therefore, it is unnecessary to provide another EEPROM in the receiving device 30, for memorizing the determination sensor ID. Accordingly, the work for memorizing the determination sensor ID can be reduced in the receiving device 30 and the cost of the receiving device 30 can be decreased.

According to the described above, only the detected data of the detecting devices 10 of the own vehicle is sent to the monitor device 50 by the receiving device 30. That is, the detected data from other vehicles are not sent to the monitor device 50. Therefore, even if the other vehicles with tire air pressure surveillance systems approach to the own vehicle, the monitor device 50 can accurately receive the detected data from the tire air pressure surveillance system 1 of the own vehicle, without exceeding a permissible receiving amount of the monitor device 50.

According to step S40 of FIG. 3A, the monitor device 50 sends in broadcast the determination sensor ID of all the detecting devices 10 to all the receiving devices 30 at one time. Therefore, the sending process of the determination sensor ID can be simplified.

Furthermore, the detected data sent by the one detecting device 10 is received by the multiple receiving devices 30 at the same time. In addition, the control portion 51 of the monitor device 50 receives the detected data from the multiple receiving devices 30 at an interval that is sufficiently shorter than the sending periodicity of the detecting device 10. Therefore, the monitor device 50 receives the multiple detected data with the same determination sensor ID from the multiple receiving devices 30. Even in this case, the control portion 51 determines whether or not all the multiple detected data is from the same detecting device 10 according to receiving time, etc. Moreover, when the air pressure information of the multiple detected data is different, the most one of the detected data, which has the same air pressure information, is determined as the accurate detected data.

Figure 4:
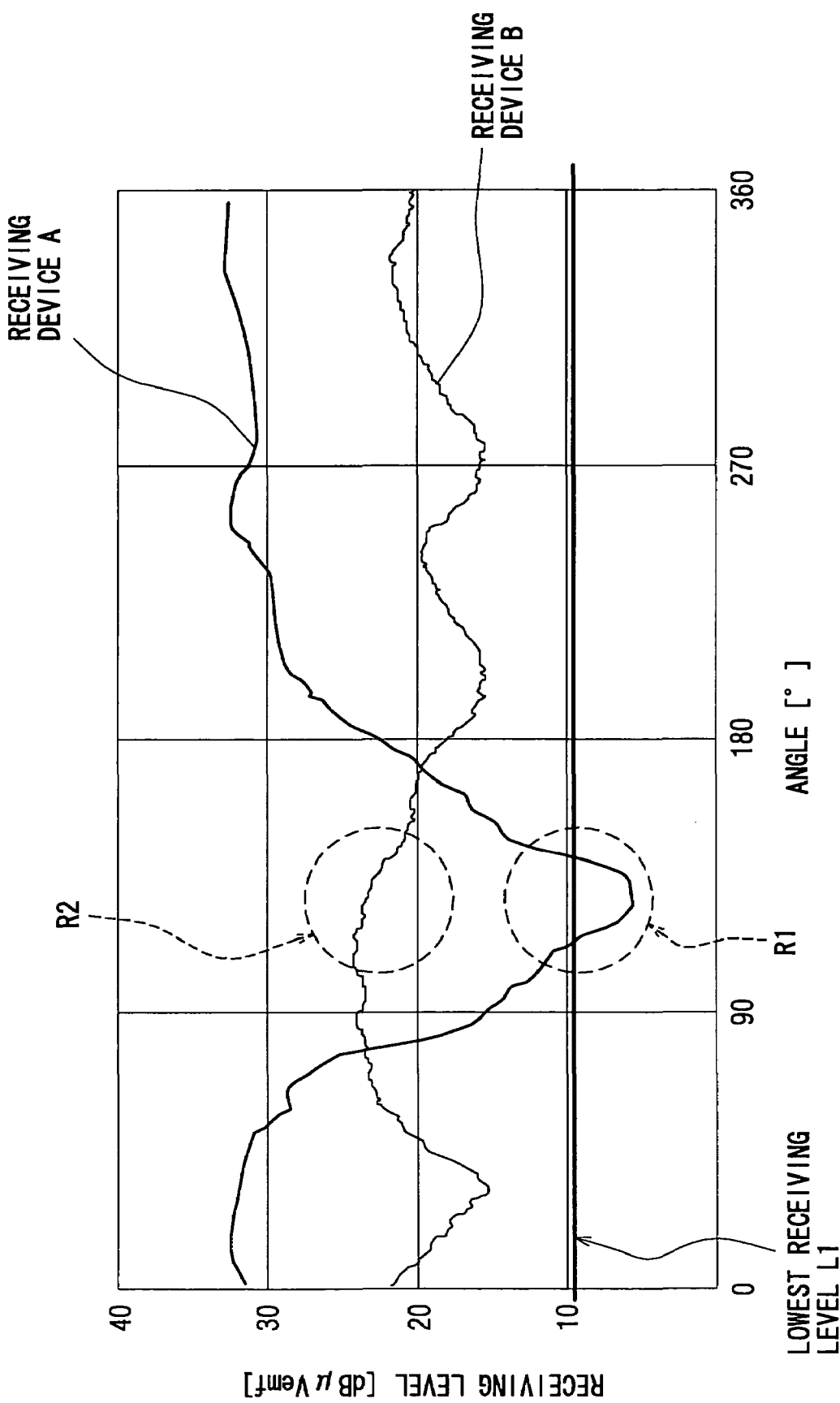
FIG. 4 is a graph showing a relationship between a receiving level of a receiving device and a rotating angle of a tire, according to the first embodiment.

As described above, the detected data from each detecting device 10 is received by the multiple receiving devices 30 at the same time, so that a space diversity can be obtained and the radio wave from the rotating tires can be efficiently received. FIG. 4 shows a relationship between the rotating angle of the tire and receiving levels of the radio wave received by the two receiving devices 30 disposed at different positions. The radio wave is sent as the sending signals of the detected data by the detecting device 10 disposed in the rotating tire. As shown in FIG. 4, the two receiving devices 30 are indicated as receiving device A and receiving device B. In a certain angle range of area R1, the receiving level of the receiving device A is less than a lowest receiving level L1 that is a lower limit for the radio wave to be accurately received by the receiving device. However, in the same angel range of area R2, the receiving level of the receiving device B is more than L1, so that the other receiving device (receiving device B) can accurately receive the radio wave even when the one receiving device (receiving device A) can not do.

In first embodiment, the EEPROM 55 of the monitor device 50 is used as a memorizing means, the ID informing process of the control portion 51 in FIG. 3A is used as a determination-information sending means, the ID receiving process of the receiving portion 30 in FIG. 3B is used as a received-information memorizing means, and the detected-data receiving process of the receiving portion 30 in FIG. 3C and the detected-data sending process of the receiving portion 30 in FIG. 3D are used as a first detected-result sending means. Furthermore, the detected data is received in the receiving device 30 as the detected result, the sensor ID produced by the control portion 11 is a distinguishing information, the determination sensor ID memorized in the EEPROM 55 is the determination information, and the determination sensor ID memorized in the RAM 31a of the receiving device 30 is the received determination information.

Second Embodiment

A second preferred embodiment of the present invention will be now described with reference to FIG. 3B and FIGS. 5A-5C. Here, only different parts from the above-described first embodiment are described.

In the second embodiment, the arrangement of a surveillance system 1 on the vehicle is the same with that of the first embodiment.

In the electrical configuration of the surveillance system 1 according to the second embodiment, a first difference from that of the first embodiment is that requiring information is given to the detected data input from the control portion 31 in some case in order to require for the monitor device 50 to send the determination sensor ID. In this case, the requiring information is one-bit datum which uses a value of 0 or 1. When the value of the requiring information is 1, the sending of the determination sensor ID is required. When the value of the requiring information is 0, the sending of the determination sensor ID is not required.

A second difference in the electrical configuration from that of the first embodiment is that an error flag F1 is provided in the RAM 31a of the control portion 31 to indicate a change of the determination sensor ID received by the receiving device 30 (called received determination sensor ID in following). The received determination sensor ID is memorized in the RAM 31a. In following description, "flag is set" means the value of the flag is set at 1, and "flag is cleared" means the value of the flag is set at 0.

These differences of the second embodiment from the first embodiment will be further described in following description of control processes.

Figure 5A:
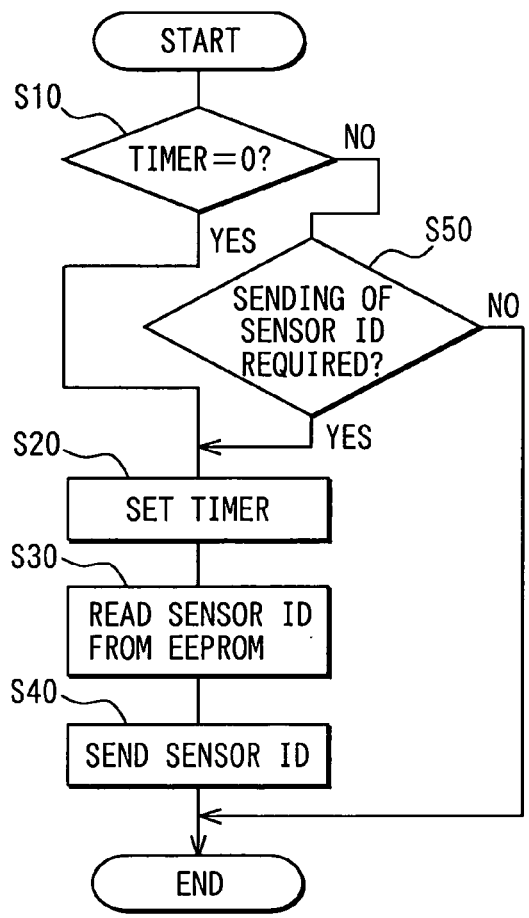
FIG. 5A is a flow diagram showing an ID informing process.

At first, the ID informing process performed in the monitor device 50 of the second embodiment is described. As shown in FIG. 5A, step S50 is added to the ID informing process of the first embodiment. At step S10, when the time value of the ID-informing timer or counter C1 is not 0 (S10: NO), step S50 is performed. At step S50, according to the requiring information received from the receiving device 30 (called received requiring information in following), it is determined whether or not there is a requirement to send the determination sensor ID. When the value of the received requiring information is 1, it is determined that there is the requirement (S50: YES) and step S20 is performed. On the other hand, when the value of the received requiring information is 0, it is determined that there is not the requirement (S50: NO), and this ID informing process is finished. When the time value of the ID-informing timer or counter C1 is 0 (S10: YES), step S20 is performed. Steps S20, S30, and S40 are the same as those of the first embodiment.

Next, the processes performed in the receiving device 30 according to the second embodiment are described. In the second embodiment, the ID receiving process at step S120 in FIG. 3B of the first embodiment is changed. That is, at step S120, the received determination sensor ID is memorized in a memorizing area of the RAM 31a of the receiving device 30. Moreover, the received determination sensor ID is memorized in a reference area of the RAM 31a as the reference data for detecting the change of the received determination sensor ID memorized in the memorizing area. Immediately after step S120 is finished, the received determination sensor ID memorized in the memorizing area is the same as that memorized in the reference area.

The detected-data receiving process of the control portion 31 of the second embodiment is the same as that in the first embodiment.

Figure 5B:
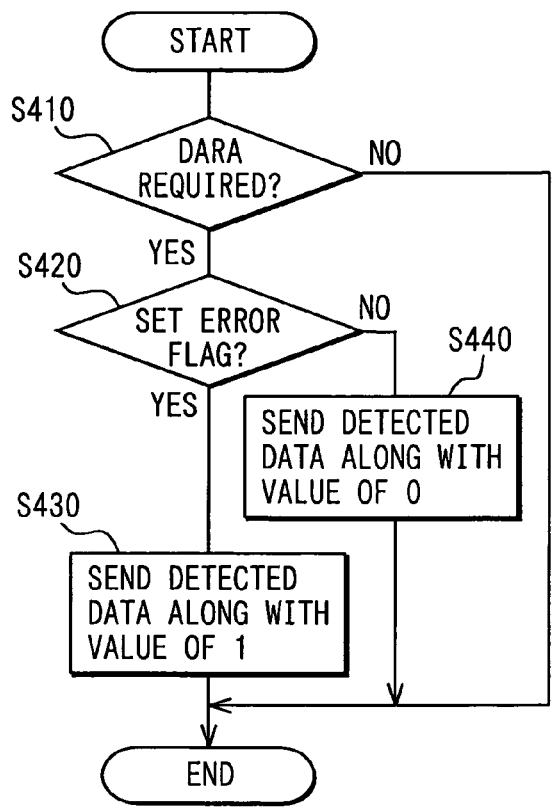
FIG. 5B is a flow diagram showing a detected-data sending process.

The detected-data sending process is described referring to FIG. 5B. At step S410, the control portion 31 determines whether or not the communication portion 35 receives the data-requiring order from the monitor device 50. When it is determined that the data-requiring order is received (S410: YES), step S420 is performed. At step S420, it is determined whether the error flag F1 is set or not. When it is determined that the error flag F1 is set (S420: YES), the requiring information with the set value 1 is given to the detected data memorized in the buffer of the RAM 31a at step S430. Furthermore, the detected data along with the requiring information is sent to the monitor device 50 through the communication portion 35 at step S430. Thereafter, this detected-data sending process is finished. On the other hand, when it is determined that the error flag F1 is not set (S420: NO), the requiring information with a set value 0 is given to the detected data memorized in the buffer of the RAM 31a, and the detected data along with the requiring information is sent to the monitor device 50 at step S440. Thereafter, this detected-data sending process is finished. Furthermore, at step S410, when it is determined that the data-requiring order is not received (S410: NO), this detected-data sending process is finished.

Figure 5C:
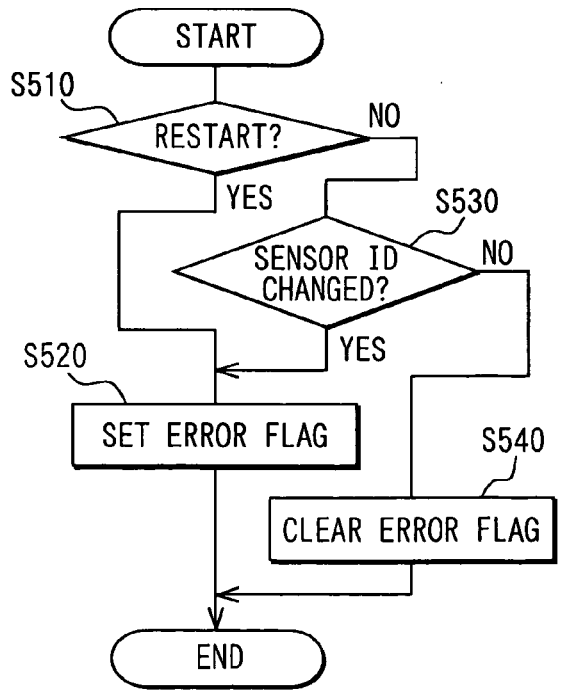
FIG. 5C is a flow diagram showing an error-detecting process, according to a second preferred embodiment of the present invention.

An error detecting process of the receiving device 30 is described referring to FIG. 5C, which is repeated when the electrical source of the control portion 31 is ON.

At step S510, it is determined whether or not the control portion 31 is restarted. When the control portion 31 is restarted, it is determined that an instantaneous interrupt of the electrical source occurs so that the received determination sensor ID memorized in the RAM 31a is cleared.

At step S510, when it is determined that the control portion 31 is restarted (S510: YES), step S520 is performed. On the other hand, when it is determined that the control portion 31 is not restarted (S510: NO), step S530 is performed. At step S530, it is determined whether the received determination sensor ID memorized in the RAM 31a changes or not. Here, the received determination sensor ID memorized in the memorizing area is compared with that in the reference area. When the values correspond to each other, it is determined that the received determination sensor ID does not change. When the values do not correspond to each other, it is determined that the received determination sensor ID changes. At step S530, when it is determined that the received determination sensor ID changes (S530: YES), step S520 is performed. On the other hand, when it is determined that the received determination sensor ID dose not change (S530: NO), step S540 is performed. At step S520, the error flag F1 is set, and thereafter this error detecting process is finished. At step S540, the error flag F1 is cleared, and thereafter this error detecting process is finished.

As described above, in the tire air pressure surveillance system 1 according to the second embodiment, when the received determination sensor ID memorized in the RAM 31a changes, the receiving device 30 sends the detected data along with the requiring information with the set value 1 to the monitor device 50. Accordingly, the monitor device 50 sends the determination sensor ID, which is memorized in the EEPROM 55 and is not changed, to the receiving device 30 once again. According to the determination sensor ID, the detected data from the detecting device 10 are sent to the monitor device 50. Therefore, it can effectively restrict the detected data from the detecting device 10 from being not sent to the monitor device 50 by the receiving device 30 when the received determination sensor ID memorized in the RAM 31a is changed to be different from the sensor ID of the detected data.

In the second embodiment, the detected-data sending process in FIG. 5B and the error detecting process in FIG. 5C are used as a requiring-order sending means of the present invention, and the processes of steps S30-S50 in FIG. 5A are used as a resending means of the present invention. Moreover, the requiring information is the sending-requiring order in the present invention.

Third Embodiment

Figure 6:
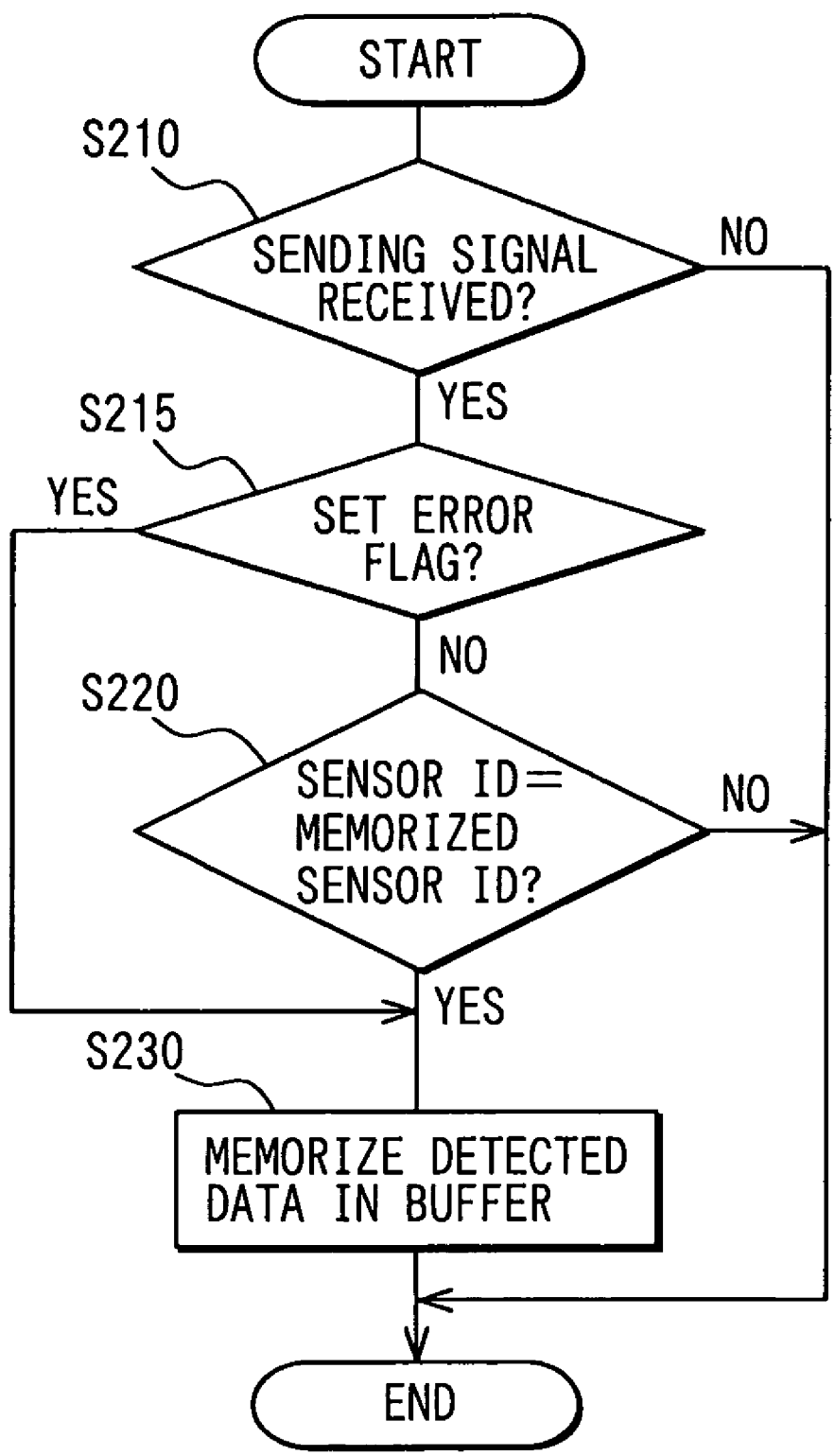
FIG. 6 is a flow diagram showing a detected-data receiving process according to a third preferred embodiment of the present invention.

A third preferred embodiment will be now described referring to FIG. 6.

The arrangement and the electrical configuration of a surveillance system 1 of the third embodiment are the same as those of the above-described first embodiment.

As compared with the control processes performed in the first embodiment, the detected-data receiving process is changed, and an error detecting process is added. The error detecting process is the same as that of the second embodiment and not described again. The ID informing process, the ID receiving process and the detected-data sending process of the third embodiment are the same as those of the first embodiment and are not described again.

Here, the detected-data receiving process of the third embodiment is described referring to FIG. 6, where step S215 is added as compared with the detected data receiving process of the first embodiment shown in FIG. 3C. At step 210, when the radio-receiving portion 33 determines that the sending signals are received (S210: YES), step S215 is performed. At step S215, it is determined whether the error flag F1 is set or not. When it is determined that the error flag F1 is set (S215: YES), step S230 is performed. On the other hand, when it is determined that the error flag F1 is not set (S215: NO), step S220 is performed. Steps S220 and S230 are the same as those of the first embodiment.

Therefore, in the tire air pressure surveillance system 1 according to the third embodiment, when the received determination sensor ID memorized in the RAM 31a changes, the receiving device 30 sends all of the received detected data to the monitor device 50. Accordingly, it can effectively restrict the detected data from the detecting device 10 from being not sent to the monitor device 50 due to the change of the received determination sensor ID, although the process load of the monitor device 50 is increased for receiving the detected data.

In this case, signals from the detecting devices of the other vehicles may be received. However, when the control portion 51 of the monitor device 50 distinguishes the signals of own vehicle and those of the other vehicles at last, the signals from the detecting devices of the own vehicle is not affected.

In this case, When the buffers in the communication portion 53 are not sufficient, the communication portion 53 will receive the new data from the receive device 30 after all the received data are outputted to the control portion 51.

In the above-described third embodiment, the processes of steps S215 and S230 in FIG. 6, the error-detecting process in FIG. 5C, and the detected-data sending process in FIG. 3D are used as a second detected-result sending means in the present invention.

Other Embodiment

Although the present invention has been fully described in connection with the preferred embodiments thereof with reference to the accompanying drawings, it is to be noted that various changes and modifications will become apparent to those skilled in the art.

For example, in the above-described embodiments, the tire air pressure surveillance system 1 is typically used for the truck. However, the tire air pressure surveillance system 1 can be used for a vehicle having a passenger compartment.

In the above-described embodiments, the multiple receiving devices 30 are provided. However, the tire air pressure surveillance system 1 can also be provided with a single receiving device 30.

Moreover, in the above-described embodiments, the LAN 70 of a cable signal channel is used for connecting the receiving device 30 and the monitor device 50. However, a radio signal channel can also be used.

Moreover, as the communication protocol for sending and receiving information through the cable signal channel, the master-slave-type protocol such as LIN is used. However, other communication protocols can also be used.

Furthermore, in the above-described second embodiment, the receiving device 30 gives the requiring information to the detected data, and sends the detected data together with the requiring information to the monitor device 50. When the sending of the determination sensor ID is required, the value of the requiring information is set at 1. When the sending of the determination sensor ID is not required, the value is set at 0. However, the present invention is not limited to that. When the sending of the determination sensor ID is not required, only the detected data can be sent to the monitor device 50. When the sending is required, a comment showing a requirement of sending the determination sensor ID can be sent to the monitor device 50, instead of the detected data.

Such changes and modifications are to be understood as being in the scope of the present invention as defined by the appended claims.

What is claimed is:

1. A tire air pressure surveillance system for a vehicle comprising:
    a plurality of air pressure detecting devices disposed in a plurality of tires of the vehicle respectively, to detect an air pressure in each of the tires and to send by radio detected results of the air pressure detecting devices along with distinguishing information which is used to distinguish each of the air pressure detecting devices;
    a plurality of receiving devices for receiving the detected results sent from the air pressure detecting devices; and
    a monitor device for monitoring the air pressure in each of the tires based on the detected results received by the plurality of receiving devices, wherein:
    the monitor device and the plurality of receiving devices are separate from each other and are connected with each other through a cable signal channel;
    the monitor device includes a memorizing means for memorizing the distinguishing information of all the air pressure detecting devices as determination information, and a
    determination-information sending means for sending the determination information memorized in the memorizing means to all of the plurality of receiving devices every a predetermined timing; and
    the plurality of receiving devices include
    a received-information memorizing means for memorizing the determination information received from the monitor device as received determination information, and
    a detected-result determining and sending means that determines whether the distinguishing information of detected results corresponds to the received determination information among the detected results received from the air pressure detecting devices, and sends the detected results along with the distinguishing information corresponding to the received determination information to the monitor device, wherein
    the determination-information sending means broadcast-sends the determination information of all the air pressure detecting devices to all of the plurality of receiving devices.

2. The tire air pressure surveillance system according to claim 1, wherein the plurality of receiving devices connect with the monitor device through a radio signal channel.

3. The tire air pressure surveillance system according to claim 1, wherein:
    the plurality of receiving devices have a requiring-order sending means which sends a sending-requiring order for requiring the monitor device to send the determination information when the received determination information is determined to be changed; and
    the monitor device has a resending means which sends the determination information to the plurality of receiving devices when the monitor device receives the sending-requiring order from the plurality of receiving devices.

4. The tire air pressure surveillance system according to claim 1, wherein
    the plurality of receiving devices have an another detected-result sending means which sends all the detected results received from the air pressure detecting devices to the monitor device when the received determination information is determined to be changed.

5. The tire air pressure surveillance system according to claim 1, wherein:
    the detected results are received in the plurality of receiving devices as detected data;
    the monitor device further includes a control portion for periodically sending a data-requiring order to the plurality of receiving devices to require a sending of the detected data; and
    the plurality of receiving devices further include:
    a control portion which gives a requiring information to the detected data received by the
    plurality of receiving devices, the requiring information being constructed with a first set value for indicating a requirement of a sending of the determination information from the monitor device, and a second set value for indicating no requirement of a sending of the determination information from the monitor device; and
    an error detecting means provided with an error flag which is set for indicating a change of the received determination information and is cleared for indicating no change of the received determination information, wherein the detected-result sending means sends the detected data to the monitor device together with the requiring information with the first set value when the error flag is set and the data-requiring order is received, or the detected data to the monitor device together with the requiring information with the second set value when the error flag is cleared and the data-requiring order is received.

6. The tire air pressure surveillance system according to claim 5, wherein the first set value is 1 and the second set value is 0.

7. A tire air pressure surveillance system for a vehicle comprising:

a plurality of air pressure detecting devices disposed in a plurality of tires of the vehicle respectively, to detect an air pressure in each of the tires and to send by radio detected results of the air pressure detecting devices along with distinguishing information which is used to distinguish each of the air pressure detecting devices;

a plurality of receiving devices for receiving the detected results sent from the air pressure detecting devices; and a monitor device for monitoring the air pressure in each of the tires based on the detected results received by the plurality of receiving devices, wherein the monitor device and the plurality of receiving devices are separate from each other and are in electrical communication with each other;

the monitor device includes a memorizing means for memorizing the distinguishing information of all the air pressure detecting devices as determination information, and a determination-information sending means for sending the determination information memorized in the memorizing means to all of the plurality of receiving devices every a predetermined timing; and the plurality of receiving devices include a received-information memorizing means for memorizing the determination information received from the monitor device as received determination information, a detected-result determining and sending means that determines whether the distinguishing information of detected results corresponds to the received determination information among the detected results received from the air pressure detecting devices, and sends the detected results along with the distinguishing information corresponding to the received determination information to the monitor device, and a requiring-order sending means which sends a sending-requiring order for requiring the monitor device to send the determination information when the received determination information is determined to be changed, wherein the monitor device has a resending means which sends the determination information to the plurality of receiving devices when the monitor device receives the sending-requiring order from the plurality of receiving devices.

8. A tire air pressure surveillance system for a vehicle comprising:

a plurality of air pressure detecting devices respectively disposed in a plurality of tires to detect and transmit tire air pressure along with distinguishing information which is used to distinguish each of the plurality of air pressure detecting devices from one another;

a plurality of separate receiving devices for receiving the detected air pressure transmitted from each of the plurality of air pressure detecting devices; and a monitor device in electrical communication with, and separate from, the plurality of receiving devices and for monitoring the air pressure in each of the plurality of tires based on the detected air pressure received by each of the plurality of receiving devices, the monitor device configured to store the distinguishing information of all the plurality of air pressure detecting devices as determination information, periodically transmit the stored determination information to all of the plurality of receiving devices after a predetermined time period has elapsed, and each of the plurality of receiving devices configured to store the determination information received from the monitor device as received determination information, and determine whether the distinguishing information of detected results corresponds to the received determination information among the detected results received from the air pressure detecting devices, and send the detected results along with the distinguishing information corresponding to the received determination information to the monitor device.

9. A tire air pressure surveillance system for a vehicle according to claim 1, wherein the monitor device includes a timer for indicating the predetermined timing at which the determination-information sending means sends the determination information memorized in the memorizing means to the plurality of receiving devices.

10. A tire air pressure surveillance system for a vehicle according to claim 7, wherein the monitor device includes a timer for indicating the predetermined timing at which the determination-information sending means sends the determination information memorized in the memorizing means to the plurality of receiving devices.

11. A tire air pressure surveillance system for a vehicle according to claim 8, wherein the monitor device includes a timer for indicating when the predetermined time period has elapsed.

* * * * *